(12) United States Patent
Kirkpatrick et al.

(10) Patent No.: US 9,347,837 B2
(45) Date of Patent: May 24, 2016

(54) MULTI-PHASE BRUSHLESS DC MOTOR CONTROL INTEGRATED CIRCUIT HAVING MAGNETIC SENSOR AND BAND-GAP TEMPERATURE SENSOR FORMED THEREON

(75) Inventors: Richard Kirkpatrick, Richardson, TX (US); Joshua Jacque Edberg, Maple Grove, MN (US); Fred W. Hintz, Freeport, IL (US); Lamar Floyd Ricks, Lewis Center, OH (US); Gregory Furlong, Freeport, IL (US)

(73) Assignee: Honeywell International Inc., Morris Plains, NJ (US)

( * ) Notice: Subject to any disclaimer, the term of this patent is extended or adjusted under 35 U.S.C. 154(b) by 495 days.

(21) Appl. No.: 13/449,071

(22) Filed: Apr. 17, 2012

(65) Prior Publication Data

US 2013/0271050 A1  Oct. 17, 2013

(51) Int. Cl.
| H03K 5/00 | (2006.01) |
| H02P 1/04 | (2006.01) |
| G05B 5/00 | (2006.01) |
| G01K 13/00 | (2006.01) |
| H02P 6/16 | (2016.01) |
| H02P 29/00 | (2016.01) |

(52) U.S. Cl.
CPC *G01K 13/00* (2013.01); *H02P 6/16* (2013.01); *H02P 29/0094* (2013.01)

(58) Field of Classification Search
CPC ............... H01L 21/30625; H01L 22/26
USPC ............... 318/472; 324/226; 361/103
See application file for complete search history.

(56) References Cited

U.S. PATENT DOCUMENTS

| 4,266,257 | A | * | 5/1981 | Rudich, Jr. ............... 361/27 |
| 6,198,184 | B1 | * | 3/2001 | Ohi et al. ............... 310/68 C |
| 6,317,391 | B1 | * | 11/2001 | Schell et al. ............... 369/13.17 |
| 6,433,615 | B2 | * | 8/2002 | Nagano et al. ............... 327/513 |
| 6,683,397 | B2 | * | 1/2004 | Gauthier et al. ............... 310/68 B |
| 7,084,597 | B2 | * | 8/2006 | Nakai et al. ............... 318/254.1 |
| 7,197,343 | B2 | | 3/2007 | Sato |
| 7,318,349 | B2 | | 1/2008 | Vaganov et al. |
| 7,367,232 | B2 | | 5/2008 | Vaganov et al. |
| 7,710,064 | B2 | | 5/2010 | Sakurai et al. |
| 7,830,104 | B2 | | 11/2010 | Takeuchi |
| 7,855,554 | B2 | | 12/2010 | Oohira |
| 2002/0121872 | A1 | * | 9/2002 | Boisvert et al. ............... 318/469 |
| 2003/0117254 | A1 | | 6/2003 | Wan et al. |
| 2003/0128490 | A1 | * | 7/2003 | Motz ............... 361/103 |
| 2006/0232393 | A1 | * | 10/2006 | Kimura et al. ............... 340/456 |
| 2008/0074068 | A1 | * | 3/2008 | Takeuchi ............... 318/472 |
| 2008/0074108 | A1 | * | 3/2008 | Ausserlechner ............... 324/226 |
| 2008/0173458 | A1 | * | 7/2008 | Seith et al. ............... 173/176 |

(Continued)

*Primary Examiner* — Bentsu Ro
*Assistant Examiner* — Devon Joseph
(74) *Attorney, Agent, or Firm* — Conley Rose, P.C.; Kristin Jordan Harkins

(57) ABSTRACT

An integrated circuit for implementing brushless DC motor control includes a substrate, a band gap temperature sensor, and a magnetic sensor. The substrate has a temperature output pin for connection to an external device and a magnetic sensor output pin for connection to the external device. The band gap temperature sensor is formed on the substrate and is configured to sense temperature and supply a temperature signal representative of the sensed temperature to the temperature output pin. The magnetic sensor is formed on the substrate and is configured to sense magnetic field variations and supply a sensor output signal representative thereof to the magnetic sensor output pin.

10 Claims, 3 Drawing Sheets

(56) References Cited

U.S. PATENT DOCUMENTS

| | | |
|---|---|---|
| 2009/0150029 A1 | 6/2009 | Pavelescu et al. |
| 2009/0289584 A1* | 11/2009 | Townsend et al. ......... 318/400.4 |
| 2009/0295169 A1* | 12/2009 | Usselman et al. ............ 290/1 A |
| 2009/0315547 A1* | 12/2009 | Abwa et al. ................... 324/244 |
| 2010/0135709 A1* | 6/2010 | McNestry et al. ............ 400/236 |
| 2011/0187303 A1* | 8/2011 | Lee et al. ................. 318/400.34 |
| 2011/0232402 A1 | 9/2011 | Schaefer et al. |
| 2012/0016614 A1* | 1/2012 | Hohe et al. ...................... 702/85 |

* cited by examiner

MULTI-PHASE BRUSHLESS DC MOTOR CONTROL INTEGRATED CIRCUIT HAVING MAGNETIC SENSOR AND BAND-GAP TEMPERATURE SENSOR FORMED THEREON

TECHNICAL FIELD

The present invention generally relates to multi-phase brushless DC motor control, and more particularly relates to an integrated circuit for controlling a multi-phase brushless DC motor that has a magnetic sensor and a band-gap temperature sensor formed thereon.

BACKGROUND

Brushless DC motors differ from conventional brush-type DC motors in that brushless DC motors are commutated electronically rather than mechanically. A multi-phase brushless DC motor includes a stator and a rotationally mounted rotor. The stator includes a plurality of stator windings that, when controllably energized, generate a rotating magnetic field. The rotor includes one or magnets. Thus, the rotating magnetic field will interact with the rotor, causing the rotor to rotate and generate a torque.

Many brushless DC motors use magnetic sensors, typically Hall sensors, to determine when to controllably energize the stator windings. More specifically, the magnetic sensors sense the rotational position of the rotor and supply the detected rotational position to a controller. The controller, based on the sensed rotor position, controllably energizes the stator windings. Many brushless DC motors also use one or more temperature sensors to sense the temperature of the stator windings. The controller, based on the sensed temperature, may slow the rotation of the rotor or, if the temperature rise is excessive, completely shut the motor down.

Motor manufacturers are continuously looking for ways to reduce component count, overall motor system size, and overall motor system costs. These considerations can present difficulties when end-users want to implement the temperature sensing and control capability. Hence, there is a need for a device that allows for implementation of the temperature sensing and control capability in brushless DC motor control that can reduce component count, and that does not adversely impact overall system size and/or cost. The present invention addresses at least these needs.

BRIEF SUMMARY

In one embodiment, an integrated circuit includes a substrate, a band gap temperature sensor, and a magnetic sensor. The substrate has a temperature output pin for connection to an external device and a magnetic sensor output pin for connection to the external device. The band gap temperature sensor is formed on the substrate and is configured to sense temperature and supply a temperature signal representative of the sensed temperature to the temperature output pin. The magnetic sensor is formed on the substrate and is configured to sense magnetic field variations and supply a sensor output signal representative thereof to the magnetic sensor output pin.

In another embodiment, a brushless DC motor control system includes an integrated circuit and a motor controller. The integrated circuit is configured to at least selectively supply rotating armature position signals, and includes a substrate, a magnetic sensor, and a band gap temperature sensor. The magnetic sensor is formed on the substrate and is configured, when energized, to sense magnetic field variations and supply rotating armature position signals in response thereto. The band gap temperature sensor is formed on the substrate, and is configured to sense temperature and supply a temperature signal representative of the sensed temperature. The motor controller is coupled to receive the rotating armature position signals and the temperature signal. The motor controller is configured, in response to the rotating armature position signals, to selectively supply current. The motor controller is further configured, in response to the temperature signal, to selectively energize and de-energize the magnetic sensor.

In yet another embodiment, an integrated circuit includes a substrate, a band gap temperature sensor, and a magnetic sensor. The band gap temperature sensor and magnetic sensor are both formed on the substrate. The band gap temperature sensor is configured to sense temperature and supply a temperature signal representative of the sensed temperature. The magnetic sensor is coupled to receive the temperature signal from the band gap temperature sensor and is configured, in response thereto, to selectively switch between an ENABLE state, in which the magnetic sensor senses magnetic field variations and supplies a sensor output signal in response thereto, and a DISABLE state, in which the magnetic sensor does not supply the output signal.

Furthermore, other desirable features and characteristics of the integrated circuits and motor controller will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
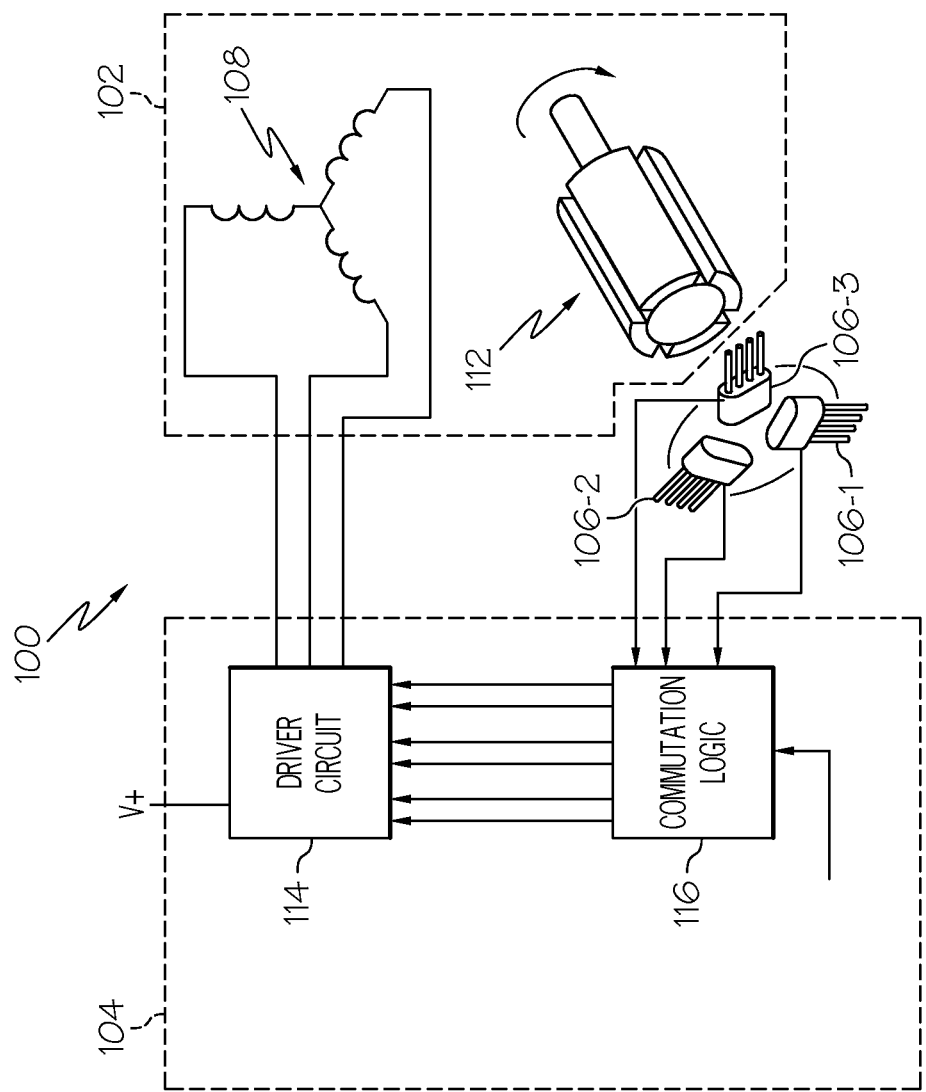
FIG. 1 is a block diagram of an embodiment of a motor control system.

Referring to FIG. 1, a functional block diagram of a motor control system 100 is depicted and includes a multi-phase brushless DC motor 102, a motor controller 104, and a plurality of integrated circuits 106. In the depicted embodiment, the multi-phase brushless DC motor 102 is implemented as a three-phase, four-pole brushless machine that includes a plurality of stator windings 108 and a permanent magnet rotor 112. As is generally known, the stator windings 108, when controllably energized, generate a rotating magnetic field that interacts with the rotor 112. The rotor 112 in turn rotates, generating a torque.

The motor controller 104 is coupled to receive rotating armature position signals and is configured, in response to the rotating armature position signals, to selectively supply current to the plurality of stator windings 108. The motor controller 104, at least in the depicted embodiment, is additionally coupled to receive a temperature signal from at least one of the integrated circuits 106 and is further configured, in response to the temperature signal, to selectively energize and de-energize at least a magnetic sensor that, as will be described momentarily, is formed on the integrated circuits 106. The motor controller 104 may additionally be configured, in response to the temperature signal, to slow the rotation of the permanent magnet rotor 112.

Figure 2:
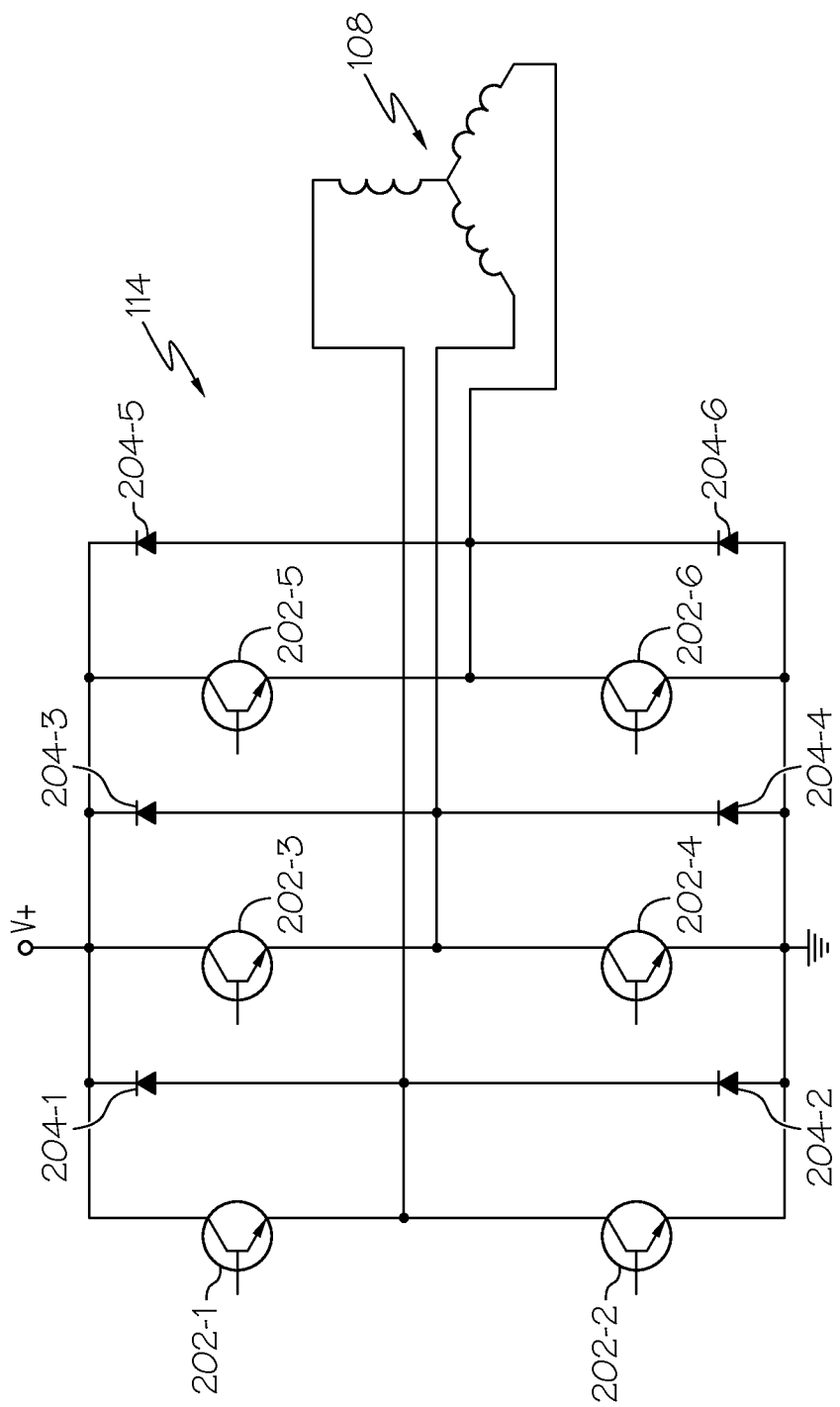
FIG. 2 depicts a schematic diagram of one embodiment of a driver circuit that may be used to implement the system of FIG. 1.

The motor controller 104 may be variously configured to implement the above-described functionality, but in the depicted embodiment it includes a driver circuit 114 and commutation logic 116. The driver circuit 114 is coupled to receive phase switching signals and is configured, in response to the switching signals, to selectively supply current to the plurality of stator windings 108. The driver circuit 114 may be variously implemented, but in the depicted embodiment is implemented using a plurality of switching devices. For example, as depicted in FIG. 2, the driver circuit 114 may be implemented using a plurality of power transistors 202 (202-1, 202-2, 202-3, ... 202-6) and diodes 204 (204-1, 204-2, 204-3, ... 204-6). The power transistors 202 are selectively activated and deactivated, in response to the phase switching signals, to controllably energize the stator windings 108. The phase switching signals are supplied to the driver circuit 114 from the commutation logic 116.

The commutation logic 116 is coupled to the driver circuit 114 and is further coupled to receive rotating armature position signals. The commutation logic 116 is configured, in response to the rotating armature position signals, to supply the phase switching signals to the driver circuit 114. The commutation logic 116 may be variously implemented depending, for example, on the type of commutation control scheme being implemented.

The integrated circuits 106 are each coupled to the commutation logic 116, and each is configured to at least selectively supply the rotating armature position signals to the commutation logic 116. The number of integrated circuits 106 may vary, but in the depicted embodiment the system 100 includes three integrated circuits 106 (106-1, 106-2, 106-3) spaced 120-degrees apart. The overall configuration of each integrated circuit 106 may vary; however, as depicted in FIGS. 3 and 4, which illustrate two different exemplary embodiments, at least one of the integrated circuits 106 includes a band gap temperature sensor 302 and a magnetic sensor 304 formed on the same substrate 306.

Figure 3:
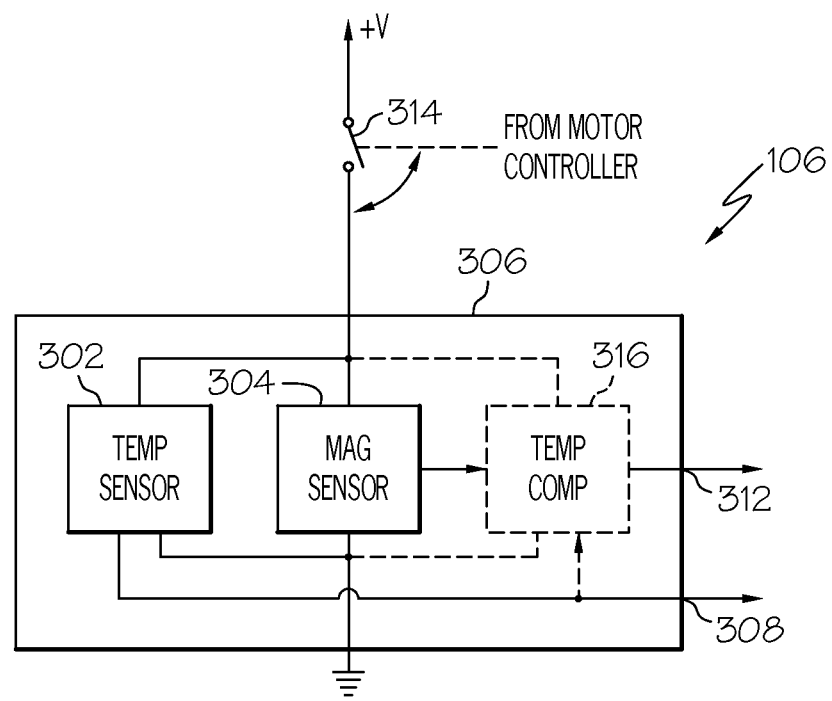
FIG. 3 depicts a functional block diagram of an embodiment of an integrated circuit that includes a magnetic sensor and band gap temperature sensor and that may be used to implement the system of FIG. 1.
Figure 4:
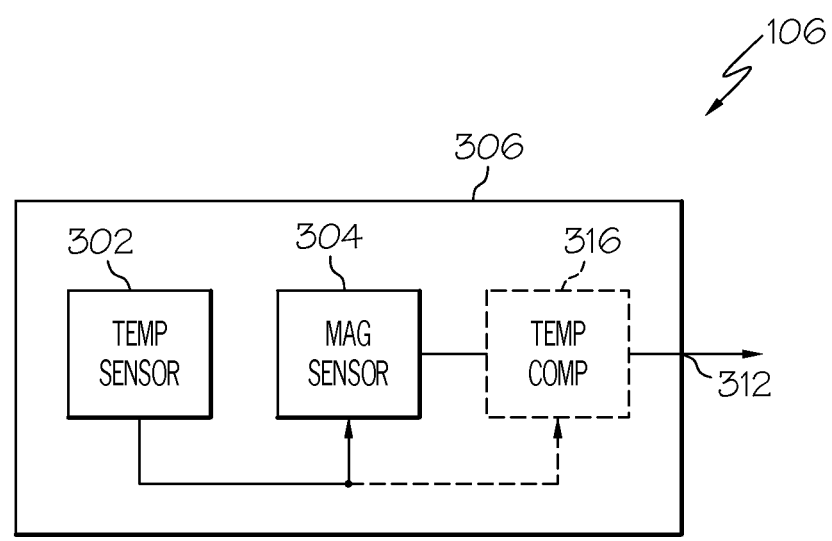
FIG. 4 depicts a functional block diagram of another embodiment of an integrated circuit that includes a magnetic sensor and band gap temperature sensor and that may be used to implement the system of FIG. 1.

With continued reference to FIGS. 3 and 4, the band gap temperature sensor 302 is configured to sense temperature and supply a temperature signal representative of the sensed temperature. As may be appreciated the temperature that the band gap temperature sensor 302 senses will be representative of the ambient environment in which the associated integrated circuit 106 is placed. Preferably, each integrated circuit 106 is placed proximate one or more of the stator windings 108, so that the sensed temperature is representative thereof. As is generally known, a band gap temperature sensor 302 is based on the principle that the base-emitter voltage ($V_{BE}$) of a bipolar junction transistor (BJT) varies with temperature in conjunction with the change over temperature in the band gap of the material in which the BJT is formed. In the embodiment depicted in FIG. 3, the temperature signal from the band gap temperature sensor 302 is supplied to a temperature output pin 308 for connection to an external device, such as the motor controller 104. In the embodiment depicted in FIG. 4, the temperature signal from the band gap temperature sensor 302 is supplied to the on-chip magnetic sensor 304.

The magnetic sensor 304, as is generally known, generates a sensor output signal that varies with sensed magnetic field strength. The sensor output signal is supplied to a magnetic sensor output pin 312 for connection to an external device, such as the motor controller 104. The magnetic sensor 304 may be a Hall sensor or it may comprise one or more anisotropic magnetic resistors (AMRs). In the depicted embodiments, when the magnetic sensor 304 is a Hall sensor, it is preferably configured as a bipolar latching type Hall sensor. With this type of Hall sensor, the sensor output signal that is generated is a square wave signal. As may be appreciated, the square wave signal is the rotating armature position signal that is supplied to the commutation logic 116.

As was noted above, in the embodiment depicted in FIG. 3, the temperature signal from the band gap temperature sensor 302 is supplied to an external device, such as the motor controller 104, via the temperature output pin 308. As was also noted above, the motor controller 104, in the embodiment depicted in FIG. 1, is coupled to receive the temperature signal supplied by the band gap temperature sensor 302. The motor controller 104, in response to the temperature signal, supplies a signal that selectively energizes and de-energizes the magnetic sensor 304. Although this functionality may be variously implemented, in the embodiment depicted in FIG. 3, the motor controller 104 supplies a switch control signal to a switching device 314 that will selectively supply and remove power to the integrated circuit 106. It will be appreciated that this is merely one non-limiting example of how this functionality may be implemented.

In the embodiment depicted in FIG. 4, the magnetic sensor 304 is additionally coupled to receive the temperature signal from the on-chip band gap temperature sensor 302, and is configured, in response to the temperature signal, to selectively switch between an ENABLE state and a DISABLE state. In the ENABLE state, the magnetic sensor 304 will sense magnetic field variations and supply rotating armature position signals in response thereto. In the DISABLE state, however, the magnetic sensor 304 will be "turned off," and not supply rotating armature position signals. Although the specific configuration may vary, in the depicted embodiment, the magnetic sensor 304 is configured to switch from the ENABLE state to the DISABLE state when the temperature signal is representative of a temperature greater than a first predetermined temperature. The magnetic sensor 304 is additionally configured to switch from the DISABLE state back to the ENABLE state when the temperature signal is representative of a temperature less than a second predetermined temperature that is less than the first predetermined temperature.

As depicted using dotted lines in FIGS. 3 and 4, it will be appreciated that the integrated circuit 106 may, in some embodiments, additionally include a temperature compensation circuit 316 on the substrate 306. The temperature compensation circuit 316, if included, is coupled to receive the temperature signal and the rotating armature position signal and is configured, in response thereto, to supply a temperature compensated output signal. In still other embodiments, the temperature compensation circuit 316 may be located apart from the integrated circuit 106, such as in the motor controller 104, or it may not be provided at all.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A brushless DC motor control system, comprising:
   an integrated circuit configured to at least selectively supply rotating armature position signals, the integrated circuit comprising:
      a substrate,
      a magnetic sensor formed on the substrate and configured, when energized, to sense magnetic field variations and supply the rotating armature position signals in response thereto, and
      a band gap temperature sensor formed on the substrate, the band gap temperature sensor configured to sense temperature and supply a temperature signal representative of the sensed temperature; and
   a motor controller coupled to receive the rotating armature position signals and the temperature signal, the motor controller configured, in response to the rotating armature position signals, to selectively supply current, and further configured, in response to the temperature signal, to (i) de-energize the magnetic sensor when the temperature signal is representative of a temperature greater than a first predetermined temperature and (ii) energize the magnetic sensor when the temperature signal is representative of a temperature less than a second predetermined temperature, the second predetermined temperature less than the first predetermined temperature.

2. The brushless DC motor control system of claim 1, wherein the magnetic sensor is a Hall sensor.

3. The brushless DC motor control system of claim 2, wherein the Hall sensor is configured as a bipolar latching type of Hall sensor.

4. The brushless DC motor control system of claim 1, wherein the magnetic sensor comprises one or more anisotropic magnetic resistors (AMRs).

5. The brushless DC motor control system of claim 1, wherein the integrated circuit consists of four leads.

6. The brushless DC motor control system of claim 1, further comprising:
   a temperature compensation circuit formed on the substrate, the temperature compensation circuit coupled to receive the temperature signal and the sensor output signal and configured, in response thereto, to supply a temperature compensated sensor output signal.

7. The brushless DC motor control system of claim 1, wherein the motor controller comprises:

a driver circuit coupled to receive phase switching signals and configured, in response to the switching signals, to selectively supply the current; and commutation logic coupled to the driver circuit and further coupled to receive the rotating armature position signals, the commutation logic configured, in response to the rotating armature position signals, to supply the phase switching signals.

8. An integrated circuit, comprising:

a substrate;

a band gap temperature sensor formed on the substrate, the band gap temperature sensor configured to sense temperature and supply a temperature signal representative of the sensed temperature; and a magnetic sensor formed on the substrate, the magnetic sensor coupled to receive the temperature signal from the band gap temperature sensor and configured, in response thereto, to selectively switch between an ENABLE state, in which the magnetic sensor senses magnetic field variations and supplies a sensor output signal in response thereto, and a DISABLE state, in which the magnetic sensor does not supply the output signal, wherein the magnetic sensor is configured to:
   switch from the ENABLE state to the DISABLE state when the temperature signal is representative of a temperature greater than a first predetermined temperature, and
   switch from the DISABLE state to the ENABLE state when the temperature signal is representative of a temperature less than a second predetermined temperature, the second predetermined temperature less than the first predetermined temperature.

9. The integrated circuit of claim 8, wherein the magnetic sensor is a Hall sensor.

10. The integrated circuit of claim 8, wherein the magnetic sensor comprises one or more anisotropic magnetic resistors (AMRs).

* * * * *